United States Patent

Barrett et al.

[15] 3,681,990
[45] Aug. 8, 1972

[54] TEMPERATURE SENSING ASSEMBLY

[72] Inventors: Charles E. Barrett, Fullerton; David R. Jacobson, San Gabriel, both of Calif.

[73] Assignee: Dresser Industries, Inc., Dallas, Tex.

[22] Filed: June 29, 1970

[21] Appl. No.: 50,764

[52] U.S. Cl. ................73/343 R, 136/221, 136/230
[51] Int. Cl. ..............................................G01k 1/14
[58] Field of Search............73/343 R, 359, 362 AR; 136/230, 232, 233, 221

[56] References Cited

UNITED STATES PATENTS

| | | | |
|---|---|---|---|
| 3,531,993 | 10/1970 | Karn | 73/343 R |
| 3,376,169 | 4/1968 | Davis | 136/230 |
| 3,281,518 | 10/1966 | Stroud | 73/343 R |

*Primary Examiner*—Louis R. Prince
*Assistant Examiner*—Denis E. Corr
*Attorney*—Robert W. Mayer, Thomas P. Hubbard, Jr., Daniel Rubin, Raymond T. Majesko, William E. Johnson, Jr., Eddie E. Scott and Roy L. Van Winkle

[57] ABSTRACT

An electrical temperature sensing assembly for detecting the temperature of a remotely located device, such as a bearing, which is operating in a cooling medium. The sensing assembly includes two releasably connected body members. One of the body members is connected to the apparatus containing the bearing and the other is connected with an electrical conduit. A union joins the two body members so that it is not necessary to rotate one body member relative to the other to remove the temperature sensing assembly from the apparatus. Furthermore, it is not necessary to disconnect the electrical conductor from the temperature probe which is contained within the body members when disassembling the temperature sensing assembly. In one embodiment, a spring encircles the temperature probe so that the probe is resiliently biased into intimate engagement with a bearing race or other device wherein the temperature is to be determined. In another embodiment, the temperature probe is rigidly secured and sealed in the body member and, yet, can be removed from the temperature sensing assembly without disconnecting the electrical circuitry connecting the probe with read-out apparatus.

3 Claims, 2 Drawing Figures

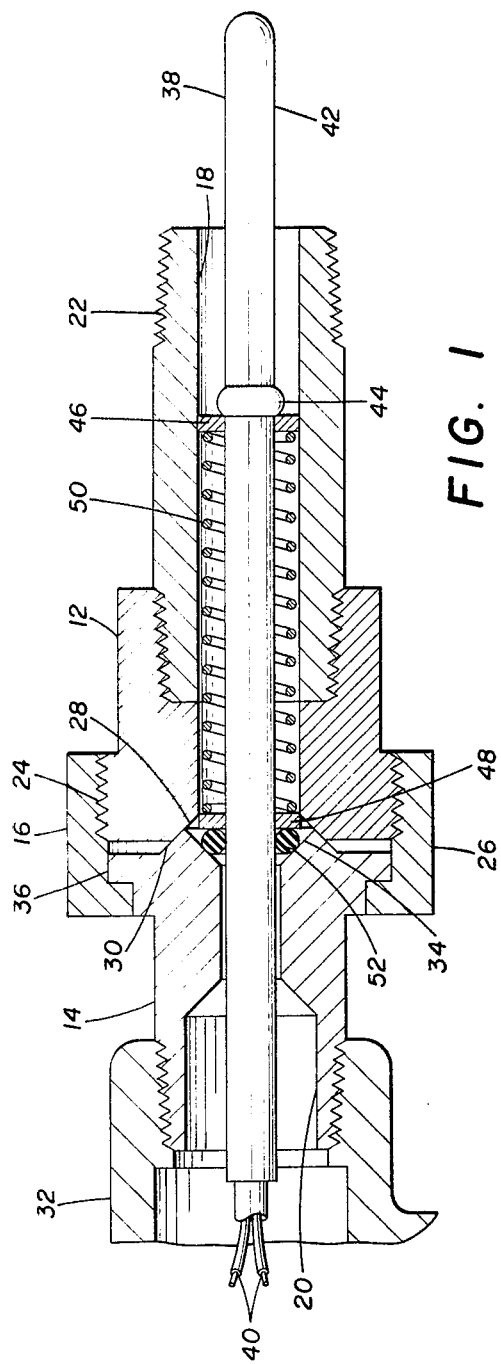
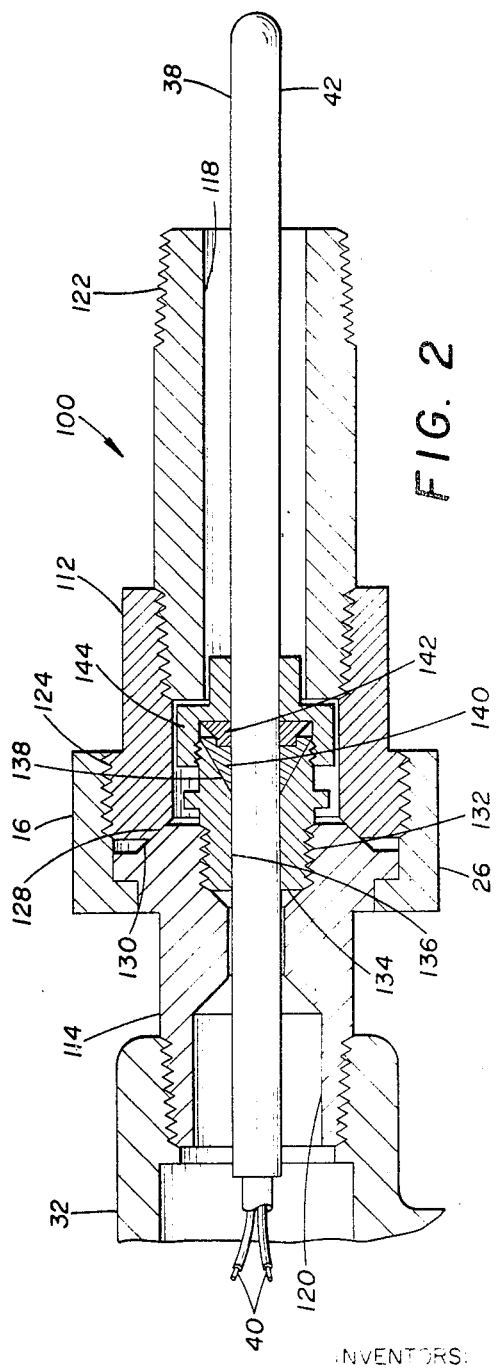

TEMPERATURE SENSING ASSEMBLY

BACKGROUND OF THE INVENTION

In the past, temperature sensing assemblies have been utilized in connection with detecting the temperature of bearings, for example, in apparatus such as centrifugal pumps. The bearings are usually located so that a coolant, such as water, is circulated thereby. Since a coolant is used, the bearings are hidden from view and it is necessary to provide a remote indicating sensing means. It has become the practice to utilize electrical temperature probes which, in many applications, must be encased in explosionproof conduit. Normal and emergency maintenance on the apparatus requires that the temperature probes be removed so that the bearings can be checked and serviced if necessary.

Under present labor practices, it is necessary that a pipe fitter or similar technician be utilized to disconnect pipe fittings that connect the temperature probe to the apparatus and that an electrician be utilized to disconnect the electrical circuitry that must be removed in order to disconnect the pipe fittings. Thus, it is expensive, inconvenient, and, at times, virtually impossible to assure that all necessary personnel will be on hand during either routine or emergency maintenance operations.

Further, eliminating the need for disconnecting the electrical circuitry associated with the temperature sensing devices avoids the possibility of a failure of the temperature sensing probes upon reassembly of the apparatus. Such failure could result from an improperly made electrical connection. In addition, it may also be possible to avoid the necessity of recalibrating the read-out instrumentation associated with the temperature probes if the electrical connections joining the instrumentation with the probe are not disconnected during maintenance operations.

SUMMARY OF THE INVENTION

This invention provides an improved temperature sensing assembly comprising a first body member having one end adapted for connection with the apparatus wherein the temperature is to be sensed and a second end releasably connected to a second body member that is connected to an electrical conduit. Connection means releasably connects the body members so that relative rotation between the body members is not necessary for connection and disconnection. Axially aligned openings extend through the body members and an elongate sensing element or probe is located therein. The sensing element has electrical conductors extending from one end for connection with a read-out device and carries a seal for forming a fluid-tight seal between the sensing element and one of the body members.

One object of this invention is to provide an improved temperature sensing device that can be quickly and easily removed from the apparatus wherein the temperature is to be sensed without the necessity of disconnecting the electrical circuit associated with the sensing probe.

Another object of the invention is to provide an improved temperature sensing device wherein the temperature probe is resiliently biased into intimate contact with the member whose temperature is to be detected.

A further object of the invention is to provide an improved temperature sensing device wherein the temperature probe can be quickly and easily removed from the apparatus wherein the temperature is to be sensed without the necessity of disconnecting the electrical circuitry associated therewith and, yet, one in which the temperature probe is positively sealed within the body of the temperature sensing device.

The foregoing and additional objects and advantages of the invention will become more apparent as the following detailed description is read in conjunction with the accompanying drawings.

BRIEF DESCRIPTION OF THE DRAWINGS

FIG. 1 is a cross sectional view of a temperature sensing device constructed in accordance with the invention.

FIG. 2 is a cross sectional view similar to FIG. 1, but illustrating another embodiment of the temperature sensing device that is also constructed in accordance with the invention.

DESCRIPTION OF THE EMBODIMENT OF FIG. 1

Referring to the drawing and FIG. 1 in particular, shown therein and generally designated by the reference character 10 is a temperature sensing assembly constructed in accordance with the invention. The temperature sensing assembly 10 includes a body member 12 and a body member 14 that are releasably interconnected by a union fitting 16.

The body member 12 has an opening 18 extending therethrough which is held in axial alignment by the union fitting 16 with an opening 20 that extends through the body member 14. One end of the body member 12 is provided with threads 22 for connection with apparatus (not shown) wherein the temperature is to be sensed. The other end of the body member 12 is provided with an external thread 24 that mates with the internal thread formed in a union member 26 that is rotatably mounted on the body member 14. A chamfer 28 encircles the opening 18 on the end of the body member 12 having the threads 24.

The body member 14 is provided with a frusto-conical projection 30 that mates with the chamfer 28 to form a fluid-tight seal when the union fitting 16 securely connects the body members 12 and 14 in end to end relationship as shown in FIG. 1. The opposite end of the body member 14 is threadedly connected with an electrical conduit fitting 32, which is connected with a conduit (not shown) that extends from the temperature sensing assembly 10 to a temperature recorder or indicator (not shown).

A chamfer 34 encircles the opening 20 extending through the body member 14. The chamfer 34 is located within the frusto-conical projection 30. A radial flange 36 on the exterior of the body member 14 is arranged to be engaged by the union member 26 to retain the body member 14 connected with the body member 12 when the union member 26 is threaded onto the threads 24.

A temperature probe 38 or other sensing device is positioned in the axially aligned openings 18 and 20. Electrical conductors 40 project from one end of the probe 38 and extend into the fitting 32. The conductors 40 will be connected with circuitry extending to the read-out device (not shown).

Located adjacent the sensing end 42 of the probe 38 is an abutment 44 that is fixed on the probe 38 and is provided to retain a washer 46. A second washer 48 is slidably located on the probe 38 in spaced relationship to the washer 46. Disposed between the washers 46 and 48 is a spring 50 that is constructed of such a length so as to bias the washers 46 and 48 relatively apart.

An O-ring seal 52 that preferably has an unstressed inner diameter less than the diameter of the probe 38 is positioned on the probe 38 in engagement with the chamfer 34 on the body member 14. When assembled as shown in FIG. 1, the washer 48 engages the O-ring seal 52 so that the washer 48 is held in fixed relationship relative to the body member 14. The spring 50, due to its length, exerts a resilient, biasing force on the probe 38 through the washer 46 and abutment 44 so that the probe 38 is biased toward the apparatus (not shown) in which the temperature is to be sensed.

When it is desired to utilize the temperature sensing assembly 10, the union member 26 is rotated separating the body members 12 and 14 so that the probe 38 can be withdrawn. The body member 12 is then secured to the apparatus (not shown) by the threads 22. The probe 38 is reinserted in the opening 18 of the body member 12 and the body member 14 connected by rotating the union member 26 relative to both the body members 12 and 14. A fluid-tight seal is formed between the frusto-conical projection 30 and the chamfer 28 as the union fitting 16 is tightened. The end 42 of the probe 38 is placed in engagement with a bearing race, or similar surface, wherein the temperature is to be sensed, slightly compressing the spring 50 so that a biasing force is developed to maintain the probe 38 in intimate contact with the surface.

Most often, the bearing (not shown) will be running in a coolant. The O-ring seal 52 is in sealing engagement with the probe 38 and with the chamfer 34 and, thus, prevents the flowing of coolant through the opening 20 and into the electrical conduit fitting 32.

Since it is not necessary to rotate the body member 14 relative to the body member 12 during assembly, it is not necessary to disconnect the electrical conductors 40 nor remove the fitting 32 from the body member 14. Thus, the assembly 10 can be quickly and easily placed in service.

When it is desired to service the bearing or other apparatus, the temperature probe 38 can be quickly and easily removed by simply unscrewing the union member 26 from the body member 12 without necessitating relative rotation between the body members 12 and 14. The probe 38 is then pulled out of the opening 18. As pointed out above, there is no relative rotation between the body members 12 and 14, therefore, it is not necessary to disconnect any of the electrical conductors 40 or any of the conduit fittings 32. As a result, it is not necessary that an electrician or anyone familiar with electrical circuitry be involved in simply removing the probe 38 for the performance of routine maintenance.

DESCRIPTION OF THE EMBODIMENT OF FIG. 2

FIG. 2 illustrates another embodiment of the temperature sensing device that is generally designated by the reference character 100. Several components of the device 100 are the same as those previously described in connection with the embodiment of FIG. 1 and will be designated by the same reference characters as used in the description of FIG. 1.

The device 100 includes a body member 112 that is releasably connected to a body member 114 by the union fitting 16. The body member 112 has an opening 118 extending therethrough that is arranged in axial alignment with an opening 120 extending through the body member 114. Threads 122 are provided on one end of the body member 112 for the purpose of connecting the device 100 to apparatus (not shown) in which the temperature is to be sensed. The opposite end of the body member 112 is provided with a male thread 124 that mates with a threaded union member 26 previously described in connection with FIG. 1. The same end of the body member 112 is provided with a chamfer 128 that encircles the opening 118.

The chamfer 128 is arranged to mate and form a fluid-tight seal with a frusto-conical protuberance 130 formed on one end of the body member 114. The opposite end of the body member 114 is threadedly connected with the conduit fitting 32.

The opening 120 in the member 114 is provided with a threaded counterbore 132 that is arranged to receive a fitting 134. The fitting 134 has a bore 136 that is in axial alignment with the openings 118 and 120 and is sized to receive the temperature probe 38 as illustrated in FIG. 2.

One end of the fitting 134 is provided with a tapered recess 138 that is arranged to receive clamping and sealing members 140 and 142. The member 140 is provided with a frusto-conical outer surface that mates with the tapered recess 138 in the fitting 134 so that tightening of a threaded nut 144 onto the fitting 134 forces the members 140 and 142 into clamping and sealing engagement with the temperature probe 38. The arrangement is such that the temperature probe 38 is held securely in the body member 114 and cannot move axially in the opening 120 but can move relative to the opening 118 when the union fitting 16 is disconnected.

The device 100 will generally be used in sensing the temperature of a coolant or similar fluid that is pressurized. The members 140 and 142 assure that no fluid will get into the electrical circuitry and, further, that the fluid pressure will not dislodge the probe 38 from its desired location.

Installation of the device 100 is accomplished by disconnecting the union fitting 16 and removing the temperature probe 38 from the body member 112. The body member 112 is then connected to the apparatus (not shown) wherein the temperature is to be sensed by means of the thread 122.

The temperature probe 38, which has been installed in the body member 114, is then inserted through the opening 118 placing the surface 130 on the body member 114 in engagement with the chamfer 128 in the body member 112. Securing the union fitting 16, connects the body members 112 and 114 in end to end relationship forming a fluid-tight seal therebetween. It will be noted, that no relative rotation between the members 112 and 114 is necessary since the union member 26 is rotatable on the body member 114 as previously described in connection with the embodiment of FIG. 1. Thus, the electrical conductors 40 can remain connected throughout the entire installation procedure.

When it is desired to remove the temperature probe 38 for routine maintenance or service on the apparatus (not shown), it is only necessary to rotate the union member 26 to disconnect the body members 112 and 114 without relative rotation between such members. Since relative rotation is not required, the conductors 40 remain connected and the probe 38 is withdrawn without the necessity of utilizing the services of an electrician. Also, and as mentioned in connection with the embodiment of FIG. 1, it will generally not be necessary to recalibrate the probe 38 since the electrical connections remain intact. Thus, there is provided a temperature sensing device which can be quickly and easily installed and removed during service or routine maintenance operations on the apparatus with which the device 100 is connected.

The embodiments described hereinbefore are presented by way of example only and it will be understood that many modifications and changes can be made thereto without departing from the spirit and scope of the invention. For example, the embodiments are described in relation to temperature sensing probes. Other types of sensing probes can be substituted if desired.

The embodiments of the invention in which an exclusive property or privilege is claimed are defined as follows:

1. A temperature sensing assembly comprising:
   a first body member having a first end adapted for connection with apparatus wherein the temperature is to be sensed, a second end and an opening intersecting said ends;
   a second body member having a first end adapted for connection with a conduit, a second end engaging the second end of said first body member and an opening intersecting the end of said second body member;
   connection means releasably connecting said body members with said openings in alignment and the second ends of said body members in engagement;
   an elongate sensing element located in said aligned openings and having a sensing end disposed in said first body member and a second end having an electrical conductor extending therefrom and into the conduit;
   seal means forming a fluid-tight seal between said sensing element and one of said body members; and,
   biasing means for exerting a resilient force on said sensing element urging said element relatively toward the apparatus wherein the temperature is to be sensed, said biasing means including
   a first washer-like member slidingly disposed on said sensing element and engageable with said seal means,
   a second washer-like member disposed on the sensing portion of said sensing element, and
   a helical spring encircling said sensing element between and engaging said washer-like members and having an unstressed length greater than the distance between said washer-like members.

2. The sensing assembly of claim 1 wherein said seal means comprises a deformable O-ring having an unstressed inner diameter smaller than said sensing element encircling said sensing element and sealingly engaging the second end of said second body member.

3. A temperature sensing assembly comprising:
   a first body member having a first end adapted for connection with apparatus wherein the temperature is to be sensed, a second end and an opening intersecting said ends;
   a second body member having a first end adapted for connection with a conduit, a second end engaging the second end of said first body member and an opening intersecting the ends of said second body member, said second end of said second member having a conical recess encircling said opening;
   connection means releasably connecting said body members with said openings in alignment and the second ends of said body members in engagement;
   an elongate sensing element located in said aligned openings and having a sensing end disposed in said first body member and a second end having an electrical conductor extending therefrom and into the conduit; and,
   seal means forming a fluid-tight seal between said sensing element and one of said body members, said seal means including
   a deformable frusto-conical seal member encircling said sealing element and mating with the conical recess in said second member, and
   seal deforming means located on said sensing element and engaging said seal member and first body member whereby said seal member is deformed into sealing engagement with said sensing element and second body member when said connection means is connected.

* * * * *